UNITED STATES PATENT OFFICE.

FREDERICK SALATHE, OF JERSEY CITY, NEW JERSEY, ASSIGNOR TO THE LITHO-CARBON COMPANY, OF NEW YORK, N. Y.

COMPOSITION OF MATTER FOR INSULATING PURPOSES.

SPECIFICATION forming part of Letters Patent No. 452,765, dated May 19, 1891.

Application filed April 22, 1891. Serial No. 389,880. (No specimens.)

*To all whom it may concern:*

Be it known that I, FREDERICK SALATHÉ, a citizen of the United States, residing in Jersey City, in the county of Hudson and State of New Jersey, have invented a new and useful Composition of Matter for Insulating Purposes, of which the following is a specification.

The composition which I have devised is intended as an insulator, and more particularly as an efficient substitute in that connection for gutta-percha.

My improved composition consists, essentially, of a new hydrocarbon product, (which is of my own invention,) gutta-percha, and gum-shellac, in conjunction with which latter ingredient I may also use small proportions of gum-dammar or gum-copal, although I prefer to use the gum-shellac alone.

The nature and attributes of the new hydrocarbon product, as well as the process by which it is obtained, are fully set forth and claimed by me in my application for Letters Patent filed March 6, 1891, bearing Serial No. 383,942, on which Letters Patent issue of even date herewith, and to which reference is hereby made for more complete information. It is sufficient here to say that the said hydrocarbon product is a resinoid hydrocarbon of the $C_{10}H_{16}$ series, which has substantially the following analysis: carbon, 88.23; hydrogen, 11.59; oxygen, .06; sulphur, trace, the same being a solid material with a specific gravity of from 1 to 1.028, tough and of a glossy jet-black color, flexible and somewhat plastic at ordinary temperature, soluble in naphtha, benzole, chloroform, bisulphide of carbon, partially in ether, completely in turpentine, rosin-oils, &c., capable of withstanding a temperature of 600° Fahrenheit; and resisting alkalies and acids, excepting concentrated nitric and concentrated sulphuric acids. It is obtained from a natural substance, which, so far as I am at present informed, is found in the State of Texas only, but which, possibly, may exist in other localities, the treatment which I employ for obtaining this product consisting, essentially, in first separating the crude natural substance from the sand or shell rock in which it is found in nature by means of a solvent, then separating or driving off the solvent from the crude material thus obtained, and finally injecting steam or hot air into the said crude material in order to drive off the sulphur and volatile-oil constituents which are combined therewith, as well as to supply the said material with the oxygen which is lacking in the natural substance, all as more fully set forth in my aforesaid application, Serial No. 383,942.

In the preparation of the composition which is the subject of my present application its ingredients—viz., the hydrocarbon product, gutta-percha, and shellac—can be taken in various proportions. One formula which gives excellent results is: hydrocarbon product, sixty-five parts, by weight; gutta-percha, twenty-five parts, by weight; gum-shellac, ten parts, by weight; but these proportions can be varied considerably—*e. g.*, hydrocarbon product, fifty parts, by weight; gutta-percha, thirty-five parts, by weight; gum-shellac, fifteen parts, by weight; or hydrocarbon product, fifty-five parts, by weight; gutta-percha, forty parts, by weight; gum-shellac, five parts, by weight.

The amalgamating or combining of these ingredients can be accomplished in various ways. For example, the gutta-percha and gum-shellac can be melted together by steam heat, such as that of a steam-jacketed kettle, and into this molten mass the hydrocarbon product in melted condition can be introduced, the whole mass then being thoroughly mixed and amalgamated by careful stirring; or the gutta-percha and gum-shellac in solid form can be mixed together by passing them between a pair of powerful steam-heated rolls, such as used for disintegrating rubber. After the complete mixture of these two ingredients the required proportion of the hydrocarbon product in solid form is gradually added to the mass, which latter is continuously passed between the disintegrating or masticating rolls until the whole mass is perfectly uniform and homogeneous. The composition thus obtained possesses substantially all the good qualities and characteristics of gutta-percha. It is very tough, has a somewhat higher melting-point than gutta-percha, and is an absolute non-conductor of electricity and non-absorbent of water. One advantage it possesses over gutta-percha is that while the latter will become porous at a heat below 212° Fahrenheit the composition under the same conditions remains non-porous and unchanged, even when subjected to a temperature as high as 300° Fahrenheit, thus fitting the latter for uses—for example, an insulating covering or protection for underground conductors—to which gutta-percha alone cannot safely be put. Again, the composition while as efficient as gutta-percha for use in connection with submarine cables, &c., is very much cheaper than the latter.

Wires or electric conductors can be covered with this composition in the same way and by the same means employed to coat conductors with gutta-percha, and when thus applied it may or may not be covered with a braided or other textile covering, such covering being mainly required for overhead wires. The composition adheres most tenaciously to the conductor and can be stripped therefrom only with difficulty.

What I claim herein as new and of my invention is—

A composition for insulating purposes, consisting, essentially, of gutta-percha, gum-shellac, and the hereinbefore-described new hydrocarbon product, substantially as hereinbefore set forth.

In testimony whereof I affix my signature in presence of two witnesses.

FREDERICK SALATHÉ.

Witnesses:
EWELL A. DICK,
M. BAILEY.

It is hereby certified that the assignee, "The Litho-Carbon Company," in Letters Patent No. 452,765, granted May 19, 1891, upon the application of Frederick Salathé, of Jersey City, New Jersey, for an improvement in "Compositions of Matter for Insulating Purposes," should have been described and specified as *The Litho-Carbon Company, a corporation of the State of New Jersey*, instead of "The Litho-Carbon Company of New York, N. Y.;" and that the said Letters Patent should be read with this correction therein that the same may conform to the record of the case in the Patent Office.

Signed, countersigned, and sealed this 16th day of June, A. D. 1891.

[SEAL.]

CYRUS BUSSEY,
*Assistant Secretary of the Interior.*

Countersigned:
C. E. MITCHELL,
*Commissioner of Patents.*